(12) United States Patent
Bauchot et al.

(10) Patent No.: US 8,468,093 B2
(45) Date of Patent: Jun. 18, 2013

(54) METHOD AND SYSTEM FOR PERFORMING A COMMERCIAL TRANSACTION BY USING A SHORT MESSAGE SERVICE TERMINAL

(75) Inventors: Frederic Bauchot, Saint-Jeannet (FR); Gerard Marmigere, Drap (FR); Joaquin Picon, Ave Paul Cezanne (FR)

(73) Assignee: International Business Machines Corporation, Armonk, NY (US)

( * ) Notice: Subject to any disclaimer, the term of this patent is extended or adjusted under 35 U.S.C. 154(b) by 2071 days.

(21) Appl. No.: 11/081,045

(22) Filed: Mar. 15, 2005

(65) Prior Publication Data

US 2005/0215231 A1 Sep. 29, 2005

(30) Foreign Application Priority Data

Mar. 25, 2004 (EP) ..................................... 04368020

(51) Int. Cl.
*G06Q 40/00* (2012.01)
(52) U.S. Cl.
USPC ............................................. 705/40; 705/35
(58) Field of Classification Search
USPC ...................... 705/35–45; 455/407
See application file for complete search history.

(56) References Cited

U.S. PATENT DOCUMENTS

| | | | | |
|---|---|---|---|---|
| 5,903,652 | A * | 5/1999 | Mital ................................ | 705/26 |
| 6,807,410 | B1 * | 10/2004 | Pailles et al. .................... | 455/407 |
| 6,868,391 | B1 * | 3/2005 | Hultgren .......................... | 705/26 |
| 2001/0037264 | A1 * | 11/2001 | Husemann et al. ............... | 705/26 |
| 2002/0065774 | A1 * | 5/2002 | Young et al. ..................... | 705/41 |
| 2002/0128981 | A1 * | 9/2002 | Kawan et al. .................... | 705/67 |
| 2003/0130958 | A1 * | 7/2003 | Narayanan et al. .............. | 705/73 |
| 2003/0171993 | A1 * | 9/2003 | Chappuis ......................... | 705/16 |
| 2003/0212601 | A1 * | 11/2003 | Silva et al. ....................... | 705/17 |
| 2004/0019564 | A1 * | 1/2004 | Goldthwaite et al. ........... | 705/44 |
| 2006/0282382 | A1 * | 12/2006 | Balasubramanian et al. .. | 705/44 |

FOREIGN PATENT DOCUMENTS

| | | |
|---|---|---|
| WO | WO 03/063528 A2 | 7/2003 |
| WO | WO 03/063528 A3 | 7/2003 |

OTHER PUBLICATIONS

Scourias, John. A Brief Overview of GSM. Dec. 5, 1998. http://web.archive.org/web/19981205130933/http://kbs.cs.tu-berlin.de/~jutta/gsm/js-intro.html.*
Wikipedia Entry on Public Key Infrastructure. Jan. 4, 2004. http://web.archive.org/web/20040104170129/http://en.wikipedia.org/wiki/Public_key_infrastructure.*
Scourias, John. A Brief Overview of GSM. Dec. 5 1998. http://web.archive.org/web/19981205130933/http://kbs.cs.tu-berlin.de/~jutta/gsm/js-intro.html.*
9 WAP Gateways. Section 9.3.4: Others. Jan. 11, 2003. http://web.archive.org/web/20030111090436/http://www.eucybervote.org/Reports/MSI-WP2-D6V2-v1.0-08.htm.*
Tyson, Jeff. How Encryption Works. How Stuff Works Website. Jun. 3, 2003. http://web.archive.org/web/20030605174707/http://computer.howstuffworks.com/encryption.htm.*
Gao, Jerry. Mobile Payment Systems. San Jose State University. Oct. 2002. http://www/engr.sjsu.edu/gaojerry.*
3GPP TS 03.40 V7.5.0 (Dec. 2001), 3rd Generation Partnership Project; Technical Specification Group Terminals; Technical realization of the Short Message Service (SMS) (Release 1998).

* cited by examiner

*Primary Examiner* — Kambiz Abdi
*Assistant Examiner* — Stephanie M Ziegle
(74) *Attorney, Agent, or Firm* — Scully, Scott, Murphy & Presser, P.C.; Ronald Kaschak

(57) ABSTRACT

Method for performing a commercial transaction wherein a customer having a computer connected to a public network such as the Internet network and a SMS terminal is able to receive and send SMS messages over a telephone network and can order an article by using the computer to a commercial server connected to the public network.

12 Claims, 2 Drawing Sheets

METHOD AND SYSTEM FOR PERFORMING A COMMERCIAL TRANSACTION BY USING A SHORT MESSAGE SERVICE TERMINAL

FIELD OF THE INVENTION

This invention relates to systems enabling users of any public network such as the Internet network to purchase articles on sale on commercial sites and in particular relates to a method for performing a commercial transaction by using a Short Message Service (SMS) terminal.

BACKGROUND OF THE INVENTION

There are more and more users of public networks such as the Internet network who are also customers doing electronic business by ordering articles offered by commercial sites. Electronic payment over a public network is a major issue for customers as well as for the commercial sites. The most secure payment method requires extra equipment be added to the customer machine to read a credit card. Unfortunately, this type of equipment is not widely available. The most common way of payment remains the use of a Secure Socket Layer (SSL) connection between the commercial site and the customer browser. SSL is a protocol that provides privacy over the Internet. However, even with this method, the customer credit card number is still sent over the public network making this information the most desirable data for hackers.

In order to avoid the drawbacks of public networks such as the Internet, another method to conduct electronic business uses SMS messages that can be easily sent from any mobile telephone. But SMS messages have the drawback that the service is generally unsuitable for electronic commerce where a secure and controlled data delivery is required. This problem has been solved by the system described in PCT patent application WO 03/063528 wherein, when an SMS message is transmitted via a cellular transmission network from a sender to a recipient, it is required to acknowledge receipt in a predetermined way and an acknowledgement message is subsequently transmitted to the sender of the SMS message.

Even though the system described above is more secure when using the SMS messages, the customer is still required to pay for the articles ordered on a commercial site by using a credit card. Therefore, the number of the credit card has to be either forwarded to the commercial site with the risks of being uncovered by hackers attacking the database of the commercial server or to be requested by a payment server using the Internet network with the risk of being intercepted by hackers when it is transmitted over the network.

OBJECTS AND SUMMARY OF THE INVENTION

Accordingly, one object of the invention is to achieve a method for performing a commercial transaction with a commercial site where the customer is not required to forward a credit card number to the commercial site after ordering articles over a public network such as the Internet network.

Another object of the invention is to achieve a method for performing a commercial transaction with a commercial site wherein SMS messages are used for identifying and authenticating a customer after the customer has ordered articles by using a public network such as the Internet network.

According to one aspect of the invention there is provided a method for performing a commercial transaction wherein a customer having a computer connected to a public network and an SMS terminal can receive and send SMS messages over a cellular network and can order an article by using the computer to a commercial server connected to the public network. The method comprising the following steps:

sending an SMS message from the commercial server through the cellular network, the SMS message including at least the address on the cellular network of a payment server including information about the article, the customer, after receiving the SMS message on the SMS terminal, redirecting to the payment server a modified SMS message and adding to the modified SMS message at least the information enabling the identification of a customer payment means.

According to another aspect of the invention there is provided a system for performing a commercial transaction wherein a customer having a computer connected to a public network and an SMS terminal is able to receive and send SMS messages over a cellular network and can order an article by using the computer connected to a commercial server and to the public network. The system comprises a payment server in charge of debiting an account of the customer with the article price and in that the commercial server includes means for sending to the SMS terminal an SMS message including at least the address on the cellular network of the payment server so that the computer can send a modified SMS message including information to enable the payment server to identify a customer payment means.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
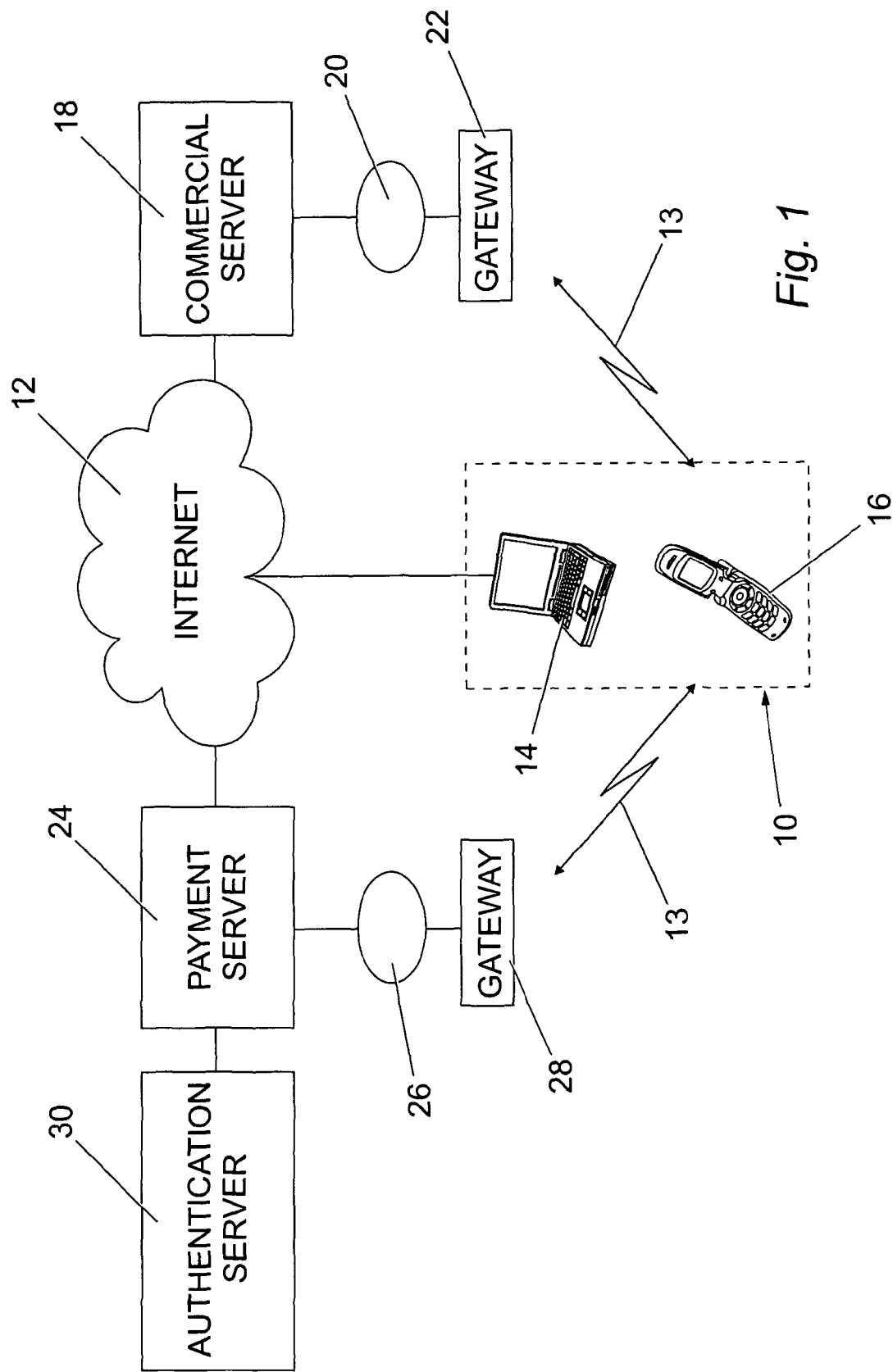
FIG. 1 is a block diagram representing a system wherein the method according to the invention is implemented.

According to a preferred embodiment illustrated in FIG. 1, a user 10 is connected to a public network 12, such as the Internet network, by a computer 14 and is connected to a cellular network 13, such as the Global System for Mobile communications (GSM) network or an equivalent network, by a mobile terminal 16.

The user 10 is a customer who is able to surf with a web browser on the site of a commercial server 18 through the public or Internet network. Assuming that customer 10 orders an article, the commercial server 18 which is also connected to an Intranet network 20 or other similar private network sends a SMS message to the customer. This SMS message is sent through the network 20 and is sent over the cellular network 13 through an SMS gateway 22.

The SMS message sent by the commercial server 18 and received by the mobile terminal 16 of the customer 10 asks the customer to provide some data to a payment server 24 connected to the Internet network. The SMS message containing now the requested information necessary to identify the customer and the number of the customer's payment card is redirected by the cellular network to the payment server through a SMS gateway 28 and over another Intranet network 26. Therefore, the sensitive information such as the customer identification number and the payment card number is neither transported over the Internet network nor shared with the commercial server 18, which are both not secure enough to avoid such sensitive information from hackers. Note that the security can be increased by an authentication server 30 in charge of authenticating the customer by an identification number on request of the payment server 24. An example of an identification number is a Mobile Station Integrated Services Digital Network (MSISDN) in the case of the GSM network.

Figure 2:
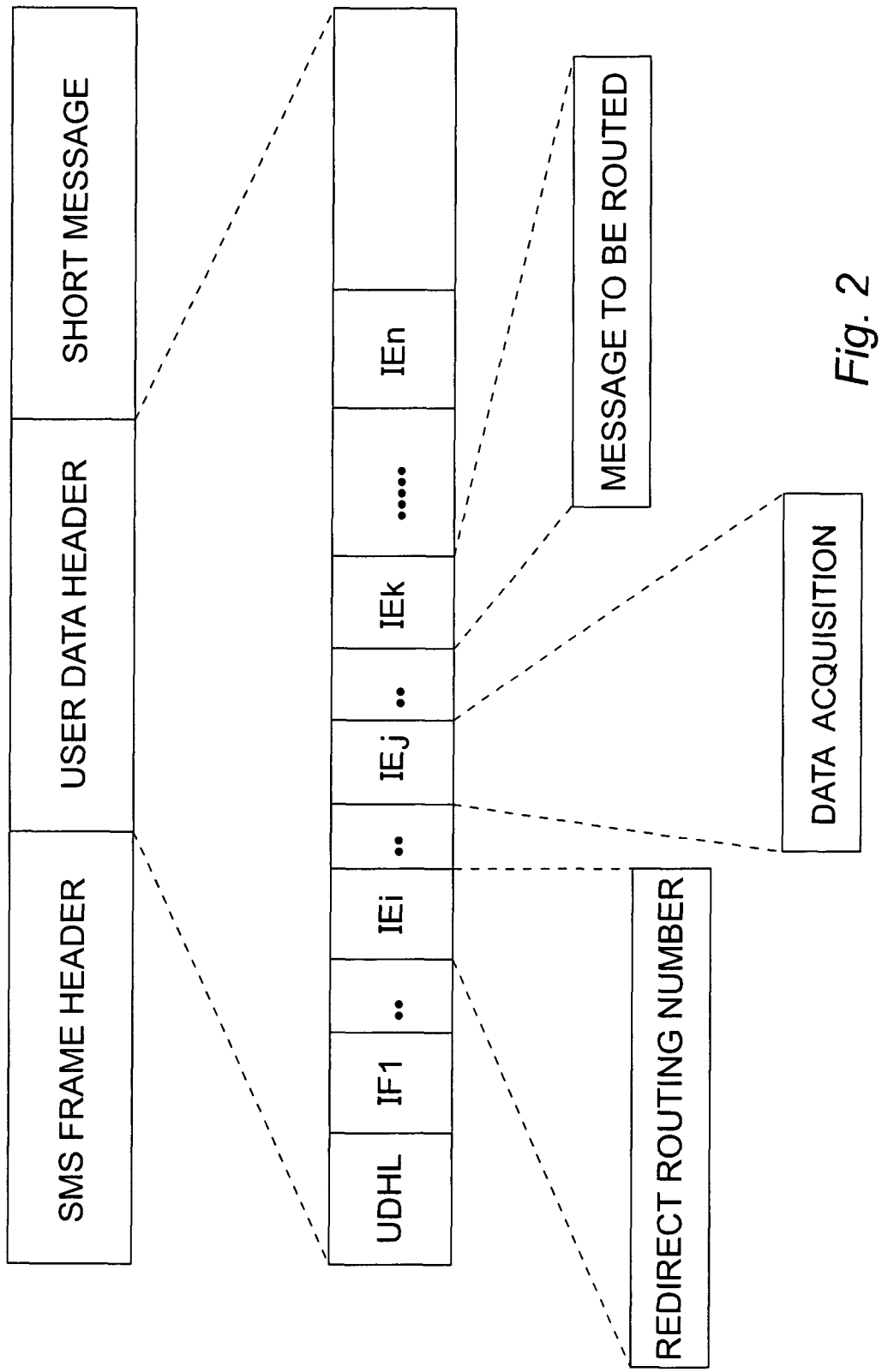
FIG. 2 is a diagram representing an SMS message and the fields thereof which are used to transport the information about the commercial transaction.

The SMS message sent by the commercial server 18 to the mobile terminal 16 is illustrated in FIG. 2. It is a data frame as specified in the 3GPP Technical Specification document "Generation partnership project"; Technical specification group terminals; Technical realization of the Short Message Service (SMS).

The SMS message contains an SMS frame header and a SMS frame body also known as the TP-UD (Transfer-layer Protocol User Data), which may comprise the short message content, i.e. the commands to manage the SMS receiving device, and in addition a User Data Header (UDH). The presence of a UDH is identified by the setting of an indicator in the SMS frame header, namely the User Data Header Indicator (UDHI). When the UDHI value is set to zero, the TP-UD field comprises only the short message. When the UDHI value is set to one, which is the case in the invention, this means that the TP-UD field comprises a User Data Header.

The User Data Header is composed of a User Data Header Length (UDHL) and a plurality of Information Elements (IE1 to IEn). Some Information Elements are currently reserved and other IE groups, at least three IEs, are not allocated and free of use. The invention allocates three IE groups for signaling the redirection of the SMS message as explained hereafter.

The three Information Elements used in the SMS according to the invention are as follows:
1. Redirect routing number
   It is the MSISDN to which the SMS has to be routed, that is the MSISDN of the payment server
2. Data acquisition
   It describes the type of data entered by the customer before rerouting the SMS
3. Message to be routed
   It is the message sent by the commercial server and rerouted to the payment server. This message contains information belonging to the transaction (order identifier, customer name, article price)

It must be noted that data sent by the user can be encrypted with a key provided by the commercial server. Generally, this key is the public key of the payment server and is contained in the Data acquisition element.

The contents of the Data acquisition element are the following:
First byte
Bits 7 6
0 0 No input
0 1 Unused
1 0 Alphanumeric input
1 1 Numeric input
Input Digits count qualifier
Bit 5
0 0 Number of digits required
0 1 Maximum number of digits
Bit 4 3
0 0 No encryption
0 1 Encryption with provided key
Bits 2 1 0 Unused
Second byte
Input Digits count
Bits 7 6 5 Unused
Bits 4 3 2 1 0 (Min 1 Max 32
Third byte Encryption key length
Fourth byte to byte n Encryption key As mentioned in the IE Data acquisition, the first byte indicates whether a numeric input must be input or not. In fact there are three possibilities within the scope of the invention:
   a) The SMS message requests the user to input his/her card number so that the payment server may authenticate the user by verifying that the owner information associated with this card number corresponds to the information provided by the commercial server. Security is ensured by the fact that the card number is transferred over a GSM link more secure than an Internet link and the card number does not transit through the commercial server and is not kept on said commercial server data base. In this case, a message is displayed on the screen of the mobile terminal, for example,
   "you ordered a Palm PDA at price 350E. Confirm by entering your Visa card number+#+personal code and press OK"
   b) The SMS message requests the user to input his/her card number as in the first embodiment by displaying a message on the screen, but the payment server has the capability to authenticate the user by MSISDN. This method increases the security as the transaction must be done with the mobile terminal of the customer registered in the commercial server.
   c) The SMS message does not request entry of the card number as above. Instead, a pin code is entered to increase security. The payment server authenticates the user by his/her MSISDN number and retrieves the card number associated with it. With this method, the card number does not transit on any network.

After the SMS message has been received by the user and information is input or not in Data acquisition as explained above, an SMS message is re-directed to the payment server. This redirected message may contain two Information elements.
1. Message to be routed which includes the same information as received by the user, that is the information belonging to the transaction (order identifier, customer name, article price)
2. Local data
   This information element contains the data entered by the user. The data is encrypted or not depending of the flag set in Data acquisition element of the received message.

After authentication of the customer by the payment server and the customer account debit, the payment server informs the commercial server that the transaction has been completed successfully and/or the customer that the account debit has been completed. Then the commercial server may send a transaction receipt by mail to the customer.

It must be noted that, though the invention has been described in a preferred embodiment wherein the customer uses a mobile terminal, the invention could be implemented in any system wherein the customer has a terminal able to receive and send SMS messages over the GSM network or any other equivalent network different from the Internet network.

What is claimed is:

1. A method for conducting a commercial transaction between a customer and a commercial server, the customer having a computer and an SMS terminal, the computer is connected to the commercial server through a public network, and the SMS terminal can receive and send SMS messages over a cellular network, said method comprising the steps of:

the customer ordering an article by using the computer to send an order to the commercial server through the public network;

sending an SMS message, through said cellular network, from said commercial server to the customer, via said SMS terminal, said SMS message including at least the address on said cellular network of a payment server, information about said article, and a public encryption key of the payment server; and said customer, after receiving said SMS message on said SMS terminal, adding to said SMS message identification information enabling identification of a customer payment means, and encrypting said identification information using the public encryption key of the payment server received in said SMS message from the commercial server, wherein a modified SMS message is formed, and using the address of the payment server received from the commercial server, redirecting said modified message, including said encrypted identification information, to said payment server through said cellular network.

2. The method according to claim 1, wherein said SMS message includes an identification number (MSISDN) of said payment server on said cellular network.

3. The method according to claim 2, wherein said sending step includes said payment server authenticating said customer by using an identification number (MSISDN) of said customer on said cellular network.

4. The method according to claim 3, wherein said sending step includes said SMS message requesting said customer to input a customer card number into said SMS terminal, said card number being included in said modified SMS message sent to said payment server.

5. The method according to claim 4, wherein said sending step includes requesting said customer to input a PIN code into said SMS terminal, said PIN code being included in said modified SMS message sent to said payment server to retrieve said customer card number.

6. The method according to claim 1, wherein said redirecting step includes modifying said SMS message to include information such as order identifier, customer name and article price.

7. The method according to claim 6, wherein after authenticating said customer by said payment server, a customer's account is debited and said payment server informs said commercial server that said transaction has been completed successfully and/or said customer that said customer's account has been debited.

8. A system for conducting a commercial transaction between a customer and a commercial server, the customer having a computer and an SMS terminal, the computer is connected to the commercial server through a public network, and the SMS terminal is able to receive and send SMS messages over a cellular network, and wherein the customer orders an article by using said computer to send an order to the commercial server through said public network;

said system comprising a payment server in charge of debiting a customer account with said article price; and means operating on the commercial server for sending an SMS message, through said cellular network, to the customer, via said SMS terminal, said SMS message including at least the address on said cellular network of said payment server, and a public encryption key of the payment server so that said SMS terminal, after the customer adds to said SMS message information enabling identification of a customer payment means and encrypts said information using the public encryption key of the payment server received in said SMS message from the commercial server, wherein a modified SMS message is formed using the address of the payment server received from the commercial server, redirects said modified SMS message, including said encrypted identification information, to said payment server through said cellular network.

9. The system according to claim 8, wherein said customer payment means is a credit card.

10. The system according to claim 9, wherein said cellular network is a GSM network.

11. The system according to claim 9, wherein said SMS terminal is a mobile terminal.

12. The method according to claim 1, comprising the further step of the payment server decrypting the information received from the customer through the cellular network, authenticating the customer, and informing the commercial server that the transaction has been completed.

* * * * *